US011898539B2

(12) United States Patent
Schwanka Trevisan et al.

(10) Patent No.: US 11,898,539 B2
(45) Date of Patent: Feb. 13, 2024

(54) METHOD FOR CONTROLLING A WIND FARM

(71) Applicant: Wobben Properties GmbH, Aurich (DE)

(72) Inventors: Aramis Schwanka Trevisan, Aurich (DE); Angelo Mendonca, Wilhelmshaven (DE); Jair Cassoli, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/258,111

(22) PCT Filed: Jul. 5, 2019

(86) PCT No.: PCT/EP2019/068105
§ 371 (c)(1),
(2) Date: Jan. 5, 2021

(87) PCT Pub. No.: WO2020/008034
PCT Pub. Date: Jan. 9, 2020

(65) Prior Publication Data
US 2021/0285420 A1 Sep. 16, 2021

(30) Foreign Application Priority Data
Jul. 6, 2018 (DE) .................... 10 2018 116 444.0

(51) Int. Cl.
*F03D 7/00* (2006.01)
*F03D 7/04* (2006.01)
*F03D 7/02* (2006.01)

(52) U.S. Cl.
CPC ........... *F03D 7/048* (2013.01); *F03D 7/0284* (2013.01); *F03D 7/045* (2013.01); *H02J 2300/28* (2020.01)

(58) Field of Classification Search
CPC ........ F03D 7/045; F03D 9/257; F03D 7/0284; F03D 7/048; F03D 7/04; H02J 3/381;
(Continued)

(56) References Cited

U.S. PATENT DOCUMENTS 10,333,347 B2 6/2019 Münz
10,622,923 B2 * 4/2020 Andersen ............... H02P 9/006
(Continued)

FOREIGN PATENT DOCUMENTS

CN 103119818 A 5/2013
CN 104221241 A 12/2014
(Continued)

OTHER PUBLICATIONS

Anderson et al., *Subsynchronous Resonance in Power Systems*, IEEE Press 1990, 290 pages.
(Continued)

*Primary Examiner* — Julio C. Gonzalez
(74) *Attorney, Agent, or Firm* — Seed IP Law Group LLP

(57) ABSTRACT

Provided is a method for controlling a wind power system, that is to say a wind power installation or a wind farm comprising a plurality of installations, for feeding electrical power from wind into an electrical supply grid, and for damping low-frequency oscillations, in particular subsynchronous resonances, in the grid, wherein the grid has a line voltage with a nominal line frequency, wherein a damping control with a closed control circuit is used for damping the low-frequency oscillations, and the damping control for damping the low-frequency oscillations controls a feed-in of electrical power into the grid using a wind system control, the damping control is designed for a controlled system comprising the grid, the wind power system, and the wind system control, or parts thereof, wherein the damping con-
(Continued)

trol is designed such that it prevents and/or damps weakly damped modes in the closed control circuit.

19 Claims, 4 Drawing Sheets

(58) Field of Classification Search
CPC .......... H02J 2300/28; H02J 3/241; F05B 2220/70642; F05B 2270/326; F05B 2270/327; F05B 2270/335; F05B 2270/337; F05B 2260/84; Y02E 10/76; Y02E 10/72
See application file for complete search history.

(56) References Cited

U.S. PATENT DOCUMENTS

| | | | |
|---|---|---|---|
| 2012/0139243 A1* | 6/2012 | Koerber | F03D 7/0284 290/44 |
| 2012/0299305 A1 | 11/2012 | Brogan et al. | |
| 2017/0104366 A1* | 4/2017 | Munz | H02J 1/08 |
| 2018/0159453 A1 | 6/2018 | Andersen et al. | |

FOREIGN PATENT DOCUMENTS

| | | |
|---|---|---|
| CN | 106300386 A | 1/2017 |
| DE | 102015219407 A1 | 4/2017 |
| EP | 2594004 B1 | 3/2015 |
| EP | 3322060 A1 | 5/2018 |
| EP | 2801139 B1 | 3/2019 |
| WO | 2011/033044 A2 | 3/2011 |

OTHER PUBLICATIONS

Unacademy.com, "Energy of a Weakly Damped Oscillator," URL= https://unacademy.com/content/jee/study-material/physics/energy-of-a-weakly-damped-oscillator/, download date Aug. 8, 2023. (4 pages).

Zhang et al., "Subsynchronous Resonance Suppression Strategy of DFIG-based Wind Farm Based on Rotor-side Double-loop Damping Controller", *North China Electric Power*, 10, Oct. 25, 2017. (8 pages).

* cited by examiner

METHOD FOR CONTROLLING A WIND FARM

BACKGROUND

Technical Field

The present invention relates to a method for controlling a wind power system, that is to say a wind power installation or a wind farm comprising a plurality of wind power installations, for feeding electrical power from wind into an electrical supply grid, and for damping low-frequency oscillations in the electrical supply grid. The present invention also relates to a wind power system, that is to say a wind power installation or a wind farm comprising a plurality of wind power installations for carrying out a damping of this type.

Description of the Related Art

An electrical supply grid generally has a nominal line frequency of 50 Hz or 60 Hz. This nominal line frequency can also be referred to as a system frequency. The electrical supply grid can also be referred to as a supply grid or grid in a simplified and synonymous manner.

Low-frequency oscillations can occur in the supply grid which have frequencies which are below the nominal line frequency. These oscillations are often referred to as subsynchronous resonances (SSR) or subsynchronous frequencies. For this purpose, in 1990, the Institute of Electrical and Electronics Engineers (IEEE) published the following formal definition for subsynchronous resonance:

"Subsynchronous resonance is an electrical system state in which an energy exchange between an electrical network and a generator set takes place at one or more natural frequencies of the combined system that are below the synchronous frequency of the system", P. M. Anderson, B. L. Agrawal, J. E. Van Ness: "Subsynchronous Resonance in Power Systems", IEEE Press 1990.

One problem which can occur in a supply grid is that the low-frequency oscillations can excite or amplify mechanical oscillations of synchronous generators directly coupled with the electrical supply grid. This can result in damage to the generators. If they are disconnected from the electrical supply grid for protection, this can result in a weakening of the electrical supply grid.

Low-frequency pendulum oscillations in the range of a few hertz can also occur in the supply grid between grid sections, i.e., a low-frequency oscillation between a first grid section in Germany and a second grid section in France, for example. Pendulum oscillations of this type can also result in partial grid disconnections in the supply grid. In the worst case, it can result in a blackout.

Due to the fact that in many countries the number of large power stations is decreasing, while decentralized converter-based generators such as wind power installations or wind farms, for which the term wind power system is used here as a generic term, or photovoltaic installations are substituted, decentralized converter-based generators of this type are also becoming increasingly important for supporting the electrical supply grid.

In this case, the structure or the assembly of the electrical supply grid can also change. The electrical supply grid is also subject to constant changes as a result of switching on and off procedures, maintenance work on supply lines or as a result of weather conditions. This also means that network capacities and line inductances or line impedances may change constantly overall. As a result, the low-frequency oscillations may also change continuously, which makes their detection and damping difficult.

Since wind farms and wind power installations, or wind power systems, form a part of the electrical supply grid and significantly influence the network properties, they can therefore contribute to stabilizing the power systems or the supply grid and can be used as a means for damping undesired subsynchronous resonances. However, wind farms of this type must also be able to adapt to the changed network properties with respect to the low-frequency oscillations.

In the priority application for the present application, the German Patent and Trademark Office has researched the following prior art: DE 10 2015 219 407 A1, WO 2011/033044 A2, CN 106300386 A.

BRIEF SUMMARY

Described herein is at least enabling a damping effect of a wind power installation or a wind farm on low-frequency oscillations in the electrical supply grid.

A method is proposed. The method is used for controlling a wind power system, i.e., a wind farm or a wind power installation, for damping low-frequency oscillations, in particular subsynchronous resonances, in an electrical supply grid into which this wind power system feeds. In this case, the supply grid has a line voltage with a nominal line frequency, and the low-frequency oscillations which are to be damped preferably have a lower frequency than half the nominal line frequency. In this respect, subsynchronous resonances also refer to oscillations which have a lower frequency than the system frequency, here the nominal line frequency.

The low-frequency oscillations are therefore preferably smaller than 25 Hz or 30 Hz. Examples for characteristic frequency ranges for low-frequency oscillations, which are also known as "Power System Oscillations" (PSO), are approximately 0.2-3 Hz or 5-15 Hz, wherein the frequency ranges are not limited to this. These oscillations or power swings with low frequency in a supply grid can be differentiated into different oscillation modes or oscillation categories, namely into intraplant oscillations, control mode oscillations, interarea oscillations and local plant oscillations.

In this case, intraplant oscillations refer to oscillations between a plurality of production units connected to the electrical supply grid in a supply grid section. Control mode oscillations refer to oscillations caused by feedback control of production units, consumer units or transducer units connected to the electrical supply grid. Interarea oscillations refer to oscillations between a plurality of supply grid sections. Local plant oscillations refer to oscillations between a production unit connected to the electrical supply grid with the supply grid.

In particular, the low-frequency oscillations can have values of 1 Hz and less. However, they can also reach up to five times the value of the nominal line frequency. Oscillations with a frequency of a maximum of five times the value of the nominal line frequency are here referred to as low-frequency oscillations, preferably with a frequency which corresponds to no more than the nominal line frequency. In particular, the low-frequency oscillation does not have a frequency which corresponds to a multiple of the nominal line frequency. It should be noted that examining and taking into account low-frequency oscillations particularly serves to examine or ensure system stability of the electrical supply grid. This is different from assessing the network quality or signal quality of the voltage signal in the electrical supply grid, in the case of which harmonic waves are particularly important.

A damping control with a closed control circuit is used here for damping the low-frequency oscillations. This damping control is prepared for damping the low-frequency oscillations and it works in such a way that it controls a feed-in of electrical power into the electrical supply grid using a wind system control.

The wind system control can be considered to be the control of the wind power system and this includes controlling a feeder unit, particularly an inverter. The control carried out includes the feeding of electrical power as an influence possibility for damping any oscillations. Additionally, i.e., by changing the feed-in, the damping control can influence the electrical supply grid and thus also achieve damping.

It is now proposed that the damping control is designed for a particular controlled system. The controlled system comprises the electrical supply grid, the wind power system, and the wind system control. It is also possible that only a part thereof is included in each case, but in any case, all three elements are taken into consideration. This is particularly based on the consideration that each of these three elements can significantly influence or even trigger low-frequency oscillations in the electrical supply grid.

Many of the known approaches aim to detect low-frequency oscillations and then—speaking illustratively—to connect a countersignal, in any case to respond to the detected oscillation.

The approach proposed here tries to prevent this and instead is based on a control which is adapted to the system. This, i.e., the damping control, is designed in such a way that it prevents weakly damped modes in the closed control circuit and/or damps weakly damped modes of the controlled system in the closed control circuit.

The concept therefore assumes that the system has frequencies as a system property, in which frequencies weakly damped oscillations can occur if a corresponding excitation occurs. If an excitation of this type does occur, this can then result in correspondingly weakly damped modes, i.e., oscillations or oscillation modes. The system does not tend to oscillate or oscillates much less in other frequencies, even if there were an excitation. This system, which permits oscillations of this type in certain frequency ranges, has been identified here as the electrical supply grid with the wind power system and the wind system control. These three elements are therefore used as a controlled system. The wind system control can optionally be considered to be part of the wind power system, wherein, however, the wind system control and the wind power system are specifically listed as elements of the controlled system. In addition to the electrical supply grid, or a part thereof, at least the wind system control and a further part of the wind power system must therefore be elements of the controlled system.

The damping control is then adapted to this system, can therefore prevent weakly damped modes in the closed control circuit and/or damp weakly damped modes of the controlled system in the closed control circuit.

In this case, it is preferably proposed, that is to say according to the first variant, that no modes at all are examined in the uncontrolled case, i.e., in the open control circuit, but rather the damping controller is designed directly in the closed control circuit, namely in such a way that weakly damped modes in the closed control circuit are prevented. This can mean, for example, that the damping control achieves a damping property in a frequency range in which no damping or only weak damping was previously available.

Alternatively or additionally, that is to say according to the second variant, it concerns modes which would occur without this damping control, i.e., in the open control circuit, for example, which modes then no longer occur in the closed control circuit, or only occur with stronger damping.

A damping controller is therefore proposed which is suitable for the entire frequency range of the low-frequency oscillations, i.e., particularly for frequencies in the range below the nominal line frequency.

This is also based on the idea that a rigid grid is not assumed, but rather it is assumed that changes in the grid can occur which the controller can take into account. The damping controller is therefore adapted to the entire controlled system and not to a specific frequency.

The proposed controller design can be a parameterization or also a specification or modification of a control structure. For example, a state controller of different order can be selected. Even the selection of a control mode is possible, such as a selection between a PID controller and a state controller, for example.

Instead of an active or direct production of damping signals by way of the wind power installations or the wind farm, a suitable design of wind turbine controllers and/or wind farm controllers for damping low-frequency oscillations is therefore proposed by adjusting the properties of the wind power system. In this case, the wind power system itself is taken into account as part of an oscillating system.

According to one configuration, it is proposed that for designing the damping control, a network oscillation model is created and said network oscillation model comprises a network model and a wind system model.

The network model reproduces the electrical supply grid or the part thereof included in the controlled system. This can also take into account an assembly or a structure of the electrical supply grid and consumers and producers connected thereto. In this case, the structure particularly takes into account the line system including the impedances of line sections and any transformers. As consumers, particularly industrial installations and urban settlements or cities can in each case be considered to be simplified overall behavior, for example as impedance in each case. Producers can be considered in a simplified manner to be a current source or possibly more precisely to be electrical machines, for example, particularly for producers which are constructed as a conventional power station. Information regarding this, i.e., information for creating a network model of this type, can be provided by a grid operator that operates the electrical supply grid. The grid operator can therefore provide a model of this type.

The wind system model reproduces a behavior of the wind power system. Technical details of the wind system are known to and can be determined by the operator of the wind power system, which also performs the damping control here. The wind system model also comprises the behavior of the wind system control. In this case, the behavior of the wind system control is also known or results from the design of the damping control and is then known as a result.

For this purpose, it is proposed to combine the two models of the supply grid as well as the wind farm or the wind power installation in one complete model, namely the network oscillation model. The network oscillation model is therefore a modeling of the oscillating power system, that is to say the entire supply grid, or a part thereof, including the wind farm or the wind power installations. The supply grid is therefore not only modeled but the behavior of a wind farm with a farm control or a wind power installation with its installation control is also taken into account. In this case, a superordinate farm control is preferably proposed in addition to or instead of the wind system control, which farm control can control a plurality of wind farms. In this case, the wind power system also comprises a plurality of wind farms. The influence of the wind power installation or the wind farm or even the plurality of wind farms on the supply grid can therefore be co-determined. In this case, a calculation unit (processor or controller) is provided for creating the network oscillation model, which calculation unit can be arranged in a wind power installation, for example.

For this purpose, it is then proposed that at least one simplified, in particular linearized around an operational point, working model is determined from the network oscillation model, and the damping control is designed based on the at least one simplified or linearized working model. At least one simplified or linearized working model is therefore assumed. This is also based on the consideration that the network oscillation model is nonlinear. In principle, the network model, the wind system model and also the wind system control can be nonlinear. However, it is also possible that a simplification is carried out, which reduces the order of the network oscillation model, for example. In this case, a linear system can possibly arise if the working model simplified in this way no longer includes nonlinearities.

The presence of a nonlinear system means that the system properties, particularly expected oscillations or modes, can not only depend on frequencies but also on amplitudes. An analysis or controller synthesis in the frequency range, which is often desirable, is therefore at least more difficult. It is therefore proposed to determine at least one working model which is linearized around an operational point. In this case, the selection of the operational point is important. For this purpose, a plurality of operational points can be selected, for example, which will be explained below. In particular, the respective operational point which has been used previously for the design should be known, at least for subsequent use of the damping controller. If, when using the damping control, the system is in a similar operational point as in the design of the damping control being used, a well-adapted damping controller can be assumed.

For example, the level of the feed-in of electrical power can be an operational point or define an operational point at least in part.

It is therefore assumed that the network model and the wind system model are known in principle or are at least available for creating the network oscillation model. It can be present in the form of a nonlinear differential equation system, for example, in which the differential equations describe the grid and the wind farm with the farm control unit (controller).

Determining the damping parameterization can take place in such a way that firstly a system identification is carried out or at least a simplified system description is derived from the linearized or simplified working model, for example. This can take place analytically by calculating or solving differential equations or graphically by way of a pole-zero diagram or Bode diagrams, for example. Damping parameters or controller parameters of this type are determined from this system identification or description of the simplified network model, which parameters achieve a damping effect on the low-frequency oscillations. For this purpose, different controller parameters of the wind power installation are tested by a simulation or by prototype testing, in order to identify the change on system behavior, for example. In addition, different operational points can be tested for the simplified working model. A controller is subsequently designed in such a way that particularly the undamped low-frequency oscillations are damped which emerge from the system identification from the simplified working model.

According to one embodiment, control parameters, i.e., parameters of the damping control such as time constants and gain parameters, are varied and results are compared and evaluated in a simulation.

According to one embodiment, it is proposed that a plurality of linearized working models are determined for designing the damping controller by variation of operational points, and based on the plurality of linearized working models of the varied operational points, the damping control is designed in such a way that it prevents weakly damped modes in the closed control circuit and/or damps weakly damped modes of the controlled system in the closed control circuit for each of the plurality of linearized working models.

Different operational points are therefore taken into account, preferably so that the entire expected operational range can be taken into account. In this case, the controller is designed in such a way that a damping control is created which achieves a sufficiently damped behavior for all operational points and particularly for the entire relevant frequency range. The controller design therefore results in a robust controller which does not need to be adjusted for these operational points and the associated frequency range during ongoing operation. This robust controller can be designed in an analytical manner, for example, if a sufficient stability distance and/or a sufficiently strongly damped eigenvalue selection is made for each linearized working model, for example via an eigenvalue specification, i.e., the eigenvalues are selected with a sufficiently small imaginary component in comparison to their real component, for example.

However, it is also possible to simulate controllers for the different working models with simulations, in order to test and optionally adjust the robust controller until it achieves sufficient damping for all working models.

In particular, it is possible to proceed here in such a way that the linearized working models in each case form the controlled system. The closed control circuit is therefore tested with the linearized working models including the respective controller, particularly in a simulation.

Additionally or alternatively, the wind system control can be designed as robust control in relation to variations of the controlled system, in particular in relation to variations of the varied operational points, namely by way of said simulation and/or the analytical design. They can both be combined if, for example, the controller is designed in an analytical manner as a robust controller and the result is reviewed by way of simulations in the closed control circuit and optionally improved by adjusting the damping controller.

At least one electrical voltage of the electrical supply grid preferably forms an input variable and at least one electrical output current for feeding into the electrical supply grid forms an output variable of the wind system control. In particular, an electrical voltage is detected at the network connection point of the electrical supply grid for this purpose, or at a point at which a voltage representative thereof or another variable can be measured, such as at an output terminal of an inverter of the wind power system, for example. The measurement is preferably performed in three phases.

The output current which is fed into the electrical supply grid by the wind power system is provided as an output variable. The output current, which in particular is three-phase, can therefore be considered as a control variable of the damping control. Via said output current, the damping control and thus the wind power system can have an influence on the electrical supply grid and, if applicable, damp it. In particular, the output current is firstly provided as a control variable of the damping control. It can then be output as an actual output current and be fed into the electrical supply grid by means of the wind system control, which can comprise one or a plurality of inverters.

According to one embodiment, it is proposed that:
the damping control is designed as a multi-variable control, wherein at least one electrical voltage of the electrical supply grid forms an input variable and also at least one further variable forms an input variable from the list, including:
an electrical intermediate circuit voltage of a direct voltage intermediate circuit of an electrical inverter;
a reactive power emitted by the inverter;
an electrical generator power of a generator of the wind power installation or at least one of the plurality of wind power installations;
a speed of the electrical generator; and
at least one blade angle of adjustable rotor blades of the wind power installation or at least one of the plurality of wind power installations.

Additionally or alternatively, it is proposed that:
at least one electrical output current for feeding into the electrical supply grid forms an output variable of the wind system control and also at least one further variable forms an output variable of the wind control from the list, including:
the electrical intermediate circuit voltage of the direct voltage intermediate circuit;
the reactive power emitted by the inverter;
the electrical generator power;
the speed of the electrical generator; and
at least one blade angle of the adjustable rotor blades.

In control technology, a multi-variable system is understood to mean a system which has a plurality of input variables and/or a plurality of output variables. A system with a plurality of state variables but only one input variable and only one output variable is not a multi-variable system, but rather a higher-order single-variable system. In this case, input variables are usually measured variables, or variables which have already been recorded elsewhere. Output variables of the control are often setpoints or control variables and then enter into the system which is to be controlled.

It is now proposed here that there is at least one further input variable and/or at least one further output variable in addition to the input variable of the electrical voltage and the output variable of the output current.

In particular, a response of the inverter to oscillations in the electrical supply grid can be detected, or at least be incorporated into the damping control, via the intermediate circuit voltage as an input variable of the inverter.

The emitted reactive power can be a response of the control of the inverter to voltage fluctuations.

The generator power specifies information regarding the state of the generator of the wind power installation and this can have an influence on network oscillations. In particular, therein a resonance of the generator can be read as pointing to an oscillation. Similar applies to the speed of the generator.

A blade angle can provide information regarding a system state of the wind power installation, particularly also its generator. A change or activity of the blade angle or the blade angle adjustment can also be associated with an oscillation of the electrical supply grid.

Variables which can counteract or prevent an oscillation are suitable as output variables, particularly control variables. However, particularly not only the variables which are also useful as input variables and were mentioned above are suitable for this purpose.

In this case, the intermediate circuit voltage of the direct voltage intermediate circuit influences the feed-in in terms of strength and quality. In particular, a high direct voltage enables a better and faster feed-in and therefore also a change in the feed-in, wherein, however, a high direct voltage in the direct voltage intermediate circuit can form a high load for the inverter and thus can, on the other hand, be intended to be avoided. In order to meet both requirements, the direct voltage in the direct voltage intermediate circuit varies.

A voltage in the electrical supply grid can be influenced via the reactive power.

In particular, the generator can be influenced, if applicable, in an oscillation characteristic via the control of the generator power and can be damped in a corresponding controller design. The same applies to the speed of the generator.

In particular, a mechanical oscillation can be influenced via the blade angle, particularly a targeted adjustment and control of the adjustment speed of the blade angle.

It is preferably proposed that the design of the damping control is or comprises a damping parameterization and said damping parameterization is determined from an eigenvalue analysis and/or modal analysis of the simplified working model.

In the eigenvalue analysis, the eigenvalues are considered, in the present case those of the closed control circuit. An oscillation behavior can also be derived from the position of the eigenvalues in the complex plane, that is to say an oscillation frequency or natural frequency, and a damping and thus a damping behavior. The system property can be represented by eigenvalues, particularly for the linearized and thus linear working model. Variations of the damping parameterization, and thus variations of the controlled system overall, result in changes in the eigenvalues and an eigenvalue can often also be assigned to a parameter or parameter set, so that desired eigenvalues, as far as possible, can be influenced or even selected in a targeted manner by way of appropriate parameter selection.

The modal analysis is based on a similar idea. The modal analysis makes it possible to also take into account oscillation modes, in addition to the frequencies of system oscillations, i.e., oscillations which describe the system. In particular, oscillation modes are in this case to be understood to mean their damping behavior, in addition to the frequency of the respective oscillation. The modal analysis therefore detects the frequencies in addition to damping properties.

In particular, the design is such that damping parameterizations are varied, so that there are different working models with different eigenvalues and that a damping parameterization is selected and used for the damping control of the wind power system depending on the eigenvalues. The variation of the damping parameterizations, i.e., the variation of the damping parameters, results in the eigenvalues also changing and they can be represented, for example, in the complex s-plane and it can then be identified which parameter changes result in which changes in the eigenvalues. The parameterizations or the parameters can be selected based on this.

It is preferably proposed that the network oscillation model additionally comprises a generator model which emulates the behavior of synchronous generators directly coupled with the grid in the electrical supply grid.

In this case, with the additional generator model, the interactions of the synchronous generators directly coupled with the grid are taken into account in the modeling. The modeling therefore not only comprises a rigid grid, but rather therefore also takes into account interactions between synchronous generators. Such synchronous generators directly coupled with the electrical supply grid are usually present in large power stations and it has been recognized that oscillations between synchronous generators directly coupled with the electrical supply grid can often be a cause of low-frequency oscillations. With the approach of taking into account synchronous generators of this type in the network oscillation model, the damping control can be well adapted to oscillations which could be caused by synchronous generators of this type.

It is preferably proposed that for damping control, a plurality of damping parameter sets and/or a plurality of controller structures are determined and stored for selection, and that for operating the wind power system, one of the plurality of damping parameter sets or controller structures is selected and/or they can be switched between during operation of the wind power system. This selection or switch preferably takes place depending on a selection criterion. A selection criterion of this type can be a signal of a grid operator that informs the wind power system about a structural change, for example.

It has been recognized here that particularly properties of the electrical supply grid can change significantly. A robust controller can compensate for small changes without having to adapt, at least it is robust against said changes. In the case of more significant changes, this may no longer be sufficient. For example, a significant change may be that a large consumer, such as a steel foundry, for example, is not operating and is therefore effectively not connected to the electrical supply grid. The difference between whether or not this exemplary foundry is connected to the electrical supply grid can be a significant difference. A further significant difference can be whether or not an important transmission line of the electrical supply grid is disconnected. For example, to mention an illustrative example, a transmission line crossing the Ems River is regularly disconnected if a large cruise ship is coming from Papenburg via the Ems.

Both examples are usually known in advance and can be taken into account in particular by a corresponding switching signal during operation of the wind power system. The fact that they are known also means that the respective underlying descriptions of the electrical supply grid are known, for example by way of differential equations, which take into account these particularities or differences. The damping control can therefore be designed in a targeted manner for these different circumstances. There are therefore different damping controls, at least different damping parameter sets, depending on the change in the electrical supply grid also different controller structures. It is possible to select between them during operation of the wind power system, preferably also during ongoing operation.

Moreover, there may also be changes in the electrical supply grid if the grid is expanded or there are other changes present in the grid which result in significantly changed network properties. However, there may also essentially be changes in the wind power system which may be taken into account by different damping parameter sets or controller structures. As an example, a full-load operation on the one hand and a partial-load operation on the other hand may be mentioned. In partial-load operation, not only is less power available through the wind system than in full-load operation, but also wind-dependent power fluctuations can occur in partial-load operation.

It is preferably proposed that the different damping parameter sets are switched between depending on one of the following criteria, that is to say depending on an external signal of a grid operator, depending on a time of day, depending on a day of the week, depending on a calendar day, depending on a state of the electrical supply grid, and/or depending on a state of the wind power system.

Particularly the grid operator is aware of changes in their grid, such as the announcement of a large consumer disconnecting from the grid. Such incidents or other incidents can be known in advance, including the time at which they occur. In such cases, provision may be made for a switch in accordance with the time of day, the day of the week and/or a calendar day, i.e., a specific date. One example is a large consumer, for example not working at the weekend.

However, a change in the electrical supply grid can also be identified by system technology, for example, by responses of the electrical supply grid to changes in a feed size being evaluated, for example. A change in the line voltage can therefore indicate a change in the fed active power and/or reactive power properties, for example, and therefore a state of the electrical supply grid, for example how sensitive the electrical supply grid is.

A state of the wind power system, particularly how much power can currently be fed, can also be used as a criterion, in order to switch between damping parameter sets.

The different damping parameter sets can be stored on a storage unit (memory), for example.

According to one configuration, it is proposed that the network oscillation model:
includes the network model as at least one first differential equation; and
includes the wind system model as at least a second differential equation, wherein
the network oscillation model is preferably described in a nonlinear state space representation, and/or
the simplified working model is the network oscillation model which is linearized for a selected operational point, wherein
the simplified working model is preferably described in a linear state space representation.

Nonlinearities of both the electrical supply grid and the wind power system are therefore taken into account in the network oscillation model, if applicable. A nonlinear state space representation is preferably selected as a representation, as it is represented in a generalized manner in the formula (1). It contains the state variables $x_1$ to $x_n$ or its temporal derivatives $\dot{x}_1$ to $\dot{x}_n$ in the state vector x to ẋ. Input variables $u_1$ to $u_m$ are summarized in the input vector u.

$$\dot{x}=f(x,u) \quad (1)$$

This representation can describe the system being considered, that is to say the electrical supply grid or a relevant part thereof, together with the wind power system or a relevant part thereof, and the damping controller in a substantially complete system description, which also takes into account nonlinearities.

The system described in this way can then be simplified by a linearization in an operational point and linear examination methods, such as the eigenvalue analysis, can then be used as a result of this linearization. Nonlinear influences can be taken into account by different operational points, i.e., by the fact that the linearization is carried out for different operational points.

The simplified working model, that is to say the network oscillation model linearized for a selected operational point, can be described in a linear state space representation and this is shown in general terms in the formula (2). The letters in bold here also indicate vectors. Due to the linearization around a selected operational point, the system of equations relates to the change in the operational point, indicated by "Δ".

$$\Delta \dot{x} = A \Delta x + B \Delta u \qquad (2)$$

An operational point for the linearization can be defined by an active power fed by the wind power system and/or by a reactive power fed by the wind power system, for example.

It is preferably proposed that the network model and additionally or alternatively the simplified network model are detected or adjusted continuously during ongoing operation, in order to respond to changes in the structure of the electrical supply grid.

In order to address system changes in the supply grid, which can result from maintenance work on the grid, from grid expansion, from switching producers and consumers in the grid on and off, for example, it is proposed according to an embodiment to determine the damping parameters continuously and to adjust them during ongoing operation.

A wind power system is also proposed, that is to say a wind power installation or a wind farm which comprises one or a plurality of wind power installations. A wind power system of this type is prepared for feeding electrical power from wind into an electrical supply grid, and it is prepared for damping low-frequency oscillations, in particular sub-synchronous resonances, in the electrical supply grid. In this case, a supply grid is assumed which has a line voltage with a nominal line frequency, and that the low-frequency oscillations which are to be damped have a lower frequency than half the nominal line frequency.

The proposed wind power system comprises a damping control for damping the low-frequency oscillations, a closed control circuit in which the damping control is used, and a wind system control for feeding electrical power into the electrical supply grid, wherein the damping control for damping the low-frequency oscillations controls a feed-in of electrical power into the electrical supply grid using the wind system control.

The damping control is designed for a controlled system, and said controlled system comprises the electrical supply grid or a part thereof, the wind power system, or a part thereof, and the wind system control, or a part thereof. The damping control is designed in such a way that it prevents weakly damped modes in the closed control circuit and/or damps weakly damped modes of the controlled system in the closed control circuit.

In particular, the wind power system is prepared to carry out a method for controlling a wind power system and for damping low-frequency oscillations according to an embodiment described previously. In particular, the wind power system has a control device for this purpose, in particular a process computer, on which the damping control is implemented, in which a design of the damping control is carried out fully or partially and/or in which the damping parameter sets can be stored.

A storage unit is preferably provided, in order to store, for damping control, a plurality of damping parameter sets and/or a plurality of controller structures which have been determined for selection, and to have them ready for operation so that for operating the wind power system, one of the plurality of damping parameter sets or controller structures can be selected and they can be switched between during operation of the wind power system.

In particular, a selection control (controller) is provided for this purpose, in order to control a selection from the damping parameter sets or controller structures depending on a selection criterion. This makes it possible to implement a change in the damping control in a simple manner.

To summarize, described herein is making the installation controls and wind farm controls more flexible when implementing network-critical projects, and in particular to take into account weakly damped network oscillation modes in the controller design. In this case, the controller parameters of the wind power installations or the wind farm are adapted to or designed for the grid through a grid study in such a way that critical low-frequency network oscillations either do not occur or are strongly damped. An active identification of low-frequency oscillations is therefore not necessary. However, this does not rule out that the controller parameterization can also be adapted to or designed for detected low-frequency oscillations, in order to damp known low-frequency oscillations in the supply grid in a targeted manner.

BRIEF DESCRIPTION OF THE SEVERAL VIEWS OF THE DRAWINGS

The invention is explained hereinafter in an exemplary manner using embodiments with reference to the accompanying figures.

DETAILED DESCRIPTION

Figure 1:
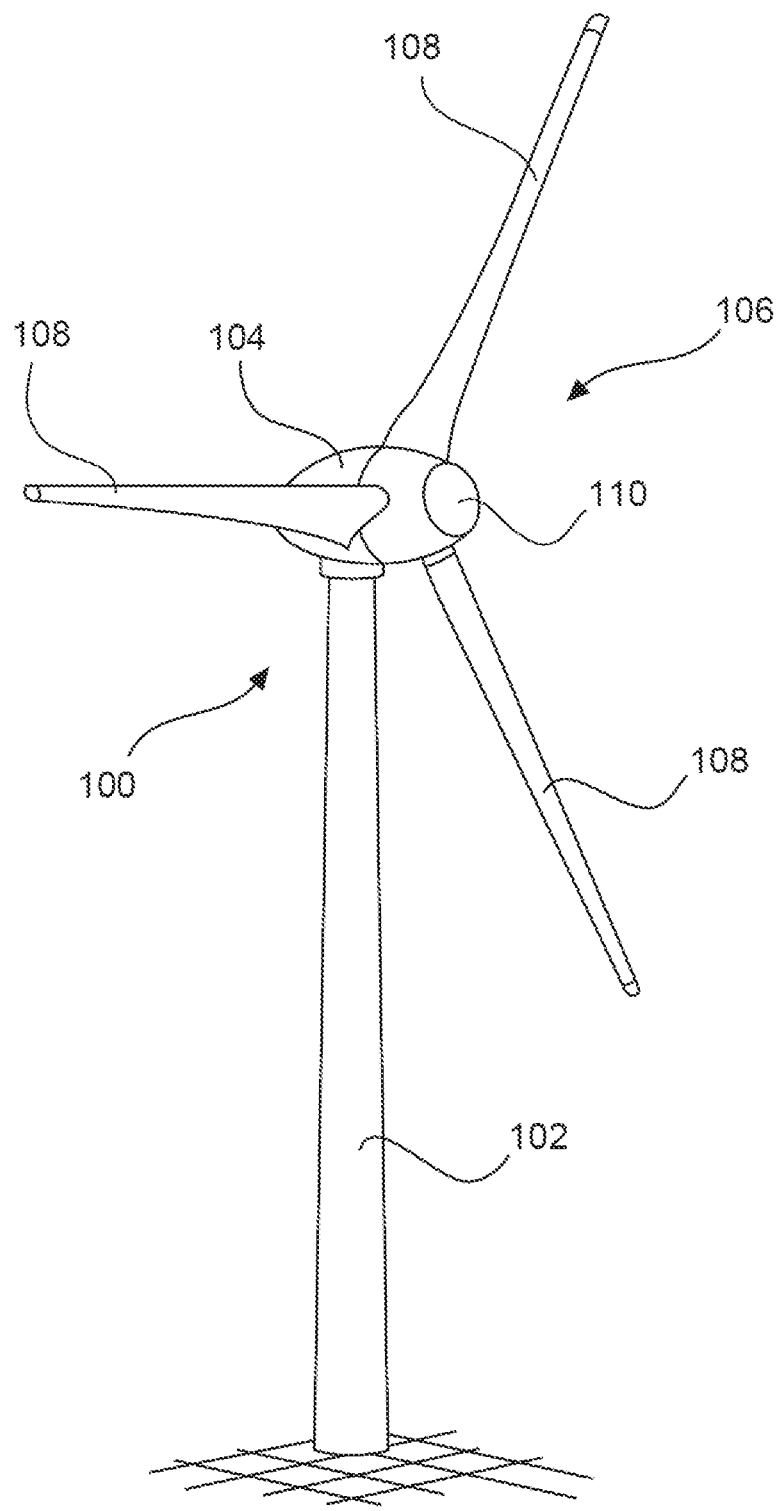
FIG. 1 shows a wind power installation in a perspective representation.

FIG. 1 shows a wind power installation 100 with a tower 102 and a nacelle 104. A rotor 106 with three rotor blades 108 and a spinner 110 is arranged on the nacelle 104. The rotor 106 is transferred into a rotational movement by the wind during operation and thus drives a generator in the nacelle 104. The wind power installation 100 can be part of a wind farm or form a wind power system itself.

Figure 2:
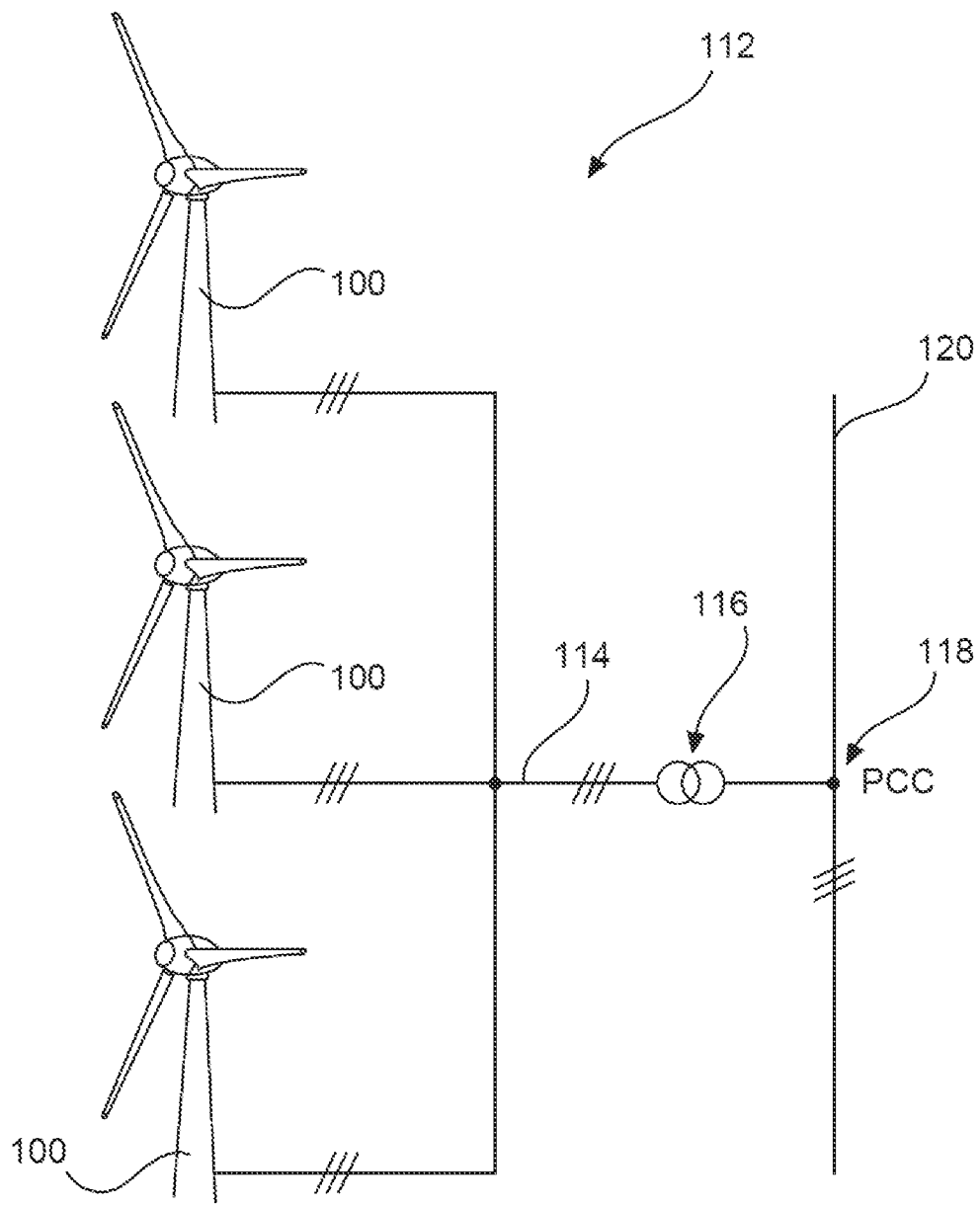
FIG. 2 schematically shows a wind farm.

FIG. 2 shows a wind farm 112 with three wind power installations 100 by way of example, which can be identical or different. The three wind power installations 100 are therefore representative of essentially any number of wind power installations of a wind farm 112. The wind power installations 100 provide their power, that is to say in particular the electricity produced via an electrical farm network 114. In this case, the currents or power produced in each case from the individual wind power installations 100 are/is added up and a transformer 116 is usually provided which boosts the voltage in the farm, in order to then feed it into the supply grid 120 at the feed-in point 118, which is also commonly referred to as PCC. FIG. 2 is merely a simplified representation of a wind farm 112 which does not show any control system, for example, even though a control system is of course present. The farm network 114 can also be configured differently, for example, by a transformer also being present at the output of each wind power installation 100, for example, to mention only one other exemplary embodiment. The wind farm 112 is an example of a wind power system.

Figure 3:
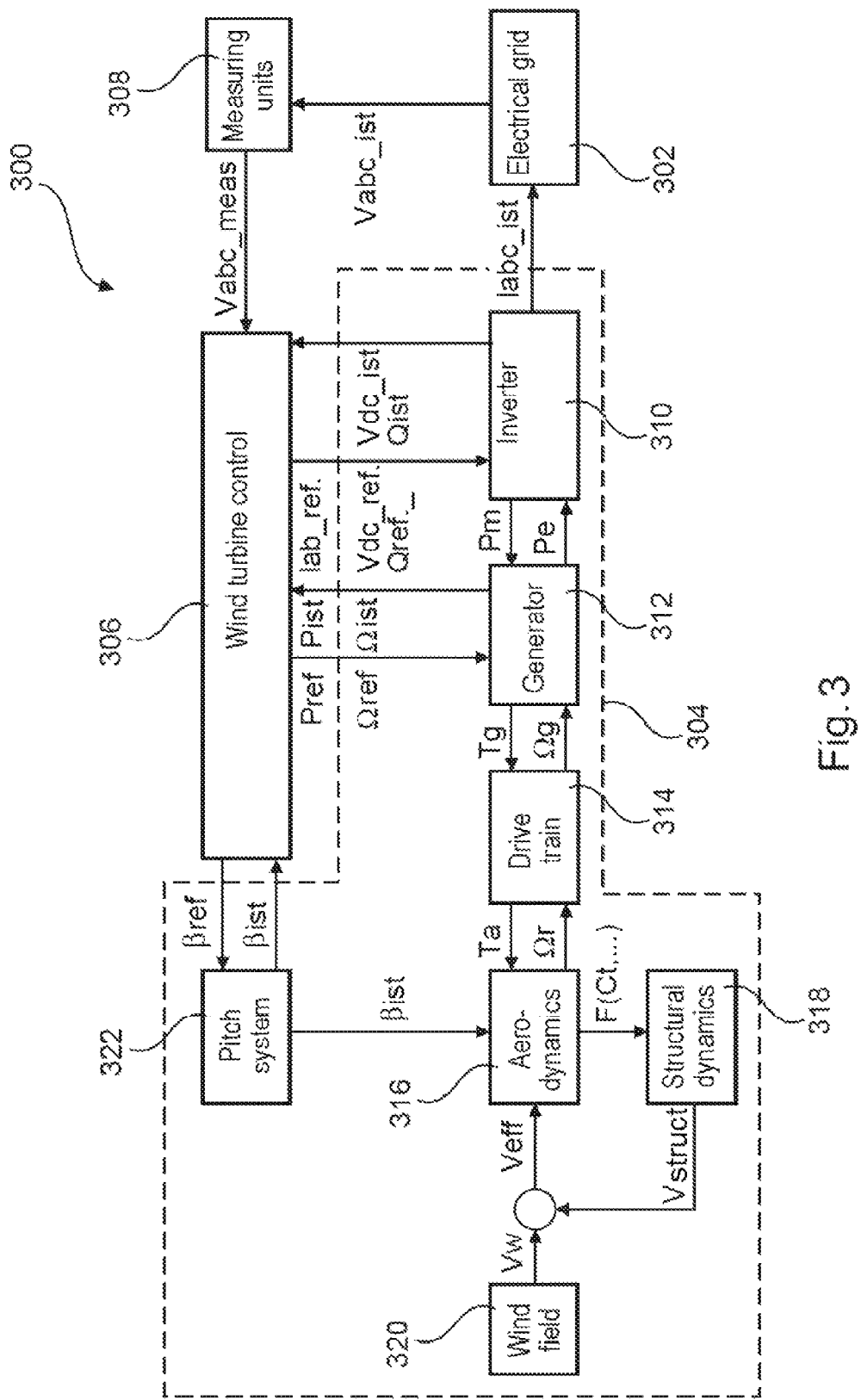
FIG. 3 schematically shows a closed control circuit which includes a network model and a wind system model, that is to say a farm model.

FIG. 3 shows a schematic closed control circuit 300 according to one embodiment. The details of the wind power system are the focus here. The control circuit 300 comprises an electrical supply grid 302, the wind power system 304 and the wind system control (controller) 306. In this embodiment, a wind power installation forms the wind power system 304.

The measuring unit (voltmeter, ammeter or sensor) 308 also shown can be assigned to the wind system control 306. The wind system control 306 can be integrated in a wind turbine control or correspond with it. In this respect, the wind system control 306 can also be understood as part of the wind power system. The wind turbine control takes into account all controlled dynamics of the wind turbine and, in this case, it is usually sufficient for the wind system control to only consider one part of the wind turbine control for damping low-frequency oscillations, or to only consider one part of the wind turbine control in the design of the damping control.

As an illustrative explanation, which is also considered to be an embodiment, the inverter 310, which can also be described as a converter, forms the control technology and the electrical supply grid 302 the system which is to be controlled, in the control circuit 300. As a control variable, the inverter 310 outputs the three-phase feed current $I_{abc}$ and feeds it into the electrical supply grid 302, which thus forms the input variable for the electrical supply grid. The electrical supply grid responds to this with a three-phase output voltage $V_{abc}$ which forms the actual variable for the system control, i.e., the damping controller, if the dynamics of the measuring unit 308 are neglected. A target/actual value comparison, which is to be expected in classic control, can be carried out in the wind system control, for example, by comparing three-phase output voltage $V_{abc}$ with an ideal output voltage, i.e., with an ideally sinusoidal output voltage. However, other variants are also possible, in which the three-phase output voltage $V_{abc}$ is only considered to be an effective value, for example, and then the control works depending on its level, i.e., depending on the voltage level, for example provides the inverter 310 with a reactive power setpoint.

However, a dynamic of the wind power system 304 is incorporated even in this simplified consideration in which the wind system control 306 only controls the inverter. The dynamic of the inverter 310 is firstly already a dynamic of the wind power system 304. However, other elements of the wind power system 304 also have an effect on the dynamic of the inverter 310. For this purpose, the generator 312 should first and foremost be mentioned. It supplies the inverter 310 with power and the dynamic of the inverter 310 therefore also depends on the dynamic of the generator 312. Moreover, the inverter 310 at least partially controls the generator 312. The inverter 310 and the generator 312 at least interact in such a way that the generator 312 provides electrical power Pe to the inverter 310, whereas the inverter at least influences or even controls the mechanical power Pm of the generator 312.

However, it is also possible that the wind system control 306 directly considers the dynamic of the generator 312 by controlling its excitation, for example, if the generator 312 is an externally excited synchronous generator. The dynamic of the generator 312 can also be directly considered by the wind system control 306 controlling a stator current of the generator 312 via the converter 310.

A drive train 314 shown can also influence the dynamic of the wind power system and thus the damping control. It transmits the rotor speed of the aerodynamic rotor, which is illustrated here as an aerodynamic block 316, as a generator speed to the generator 312 and transmits the generator torque $T_g$ as a drive torque Ta to the rotor or the aerodynamic block 316. Depending on the structure, oscillations can occur here in the drive train 314, for example, which are, however, rather small in the case of a gearless generator.

An effective wind velocity $V_{eff}$ acts on the rotor, i.e., the aerodynamic block 316, which wind velocity is calculated from the actual wind velocity $V_w$ and a structural velocity $V_{struct}$ caused by the structural dynamics of the rotor, which is added to or subtracted from depending on the sign for the actual wind velocity $V_w$. For this purpose, the structural dynamics block 318 is drawn, which outputs such an equivalent structural velocity $V_{struct}$ from the structural dynamics particularly of the rotor. The wind field block 320, which outputs the actual wind velocity $V_w$, is provided for taking into account the wind.

The wind turbine control and thus the wind system control 306 can influence the aerodynamic block 316 via the pitch block 322, that is to say by adjusting the rotor blades, which is also referred to as pitching.

There are therefore many possibilities for considering dynamics of the wind power system, both in analysis and in control. For the analytical consideration of the electrical supply grid 302, a system description is considered as a differential equation system, for example. A differential equation system can also be set up for the structure of the wind power system 304, based on the structure shown in FIG. 3. Both differential equation systems, i.e., of the electrical supply grid, which can also be referred to as a network model, and of the wind power system, which can also be referred to as a wind system model, can together result in a complete network oscillation model which can then be further used for a controller design, as described hereinafter for FIG. 4.

Figure 4:
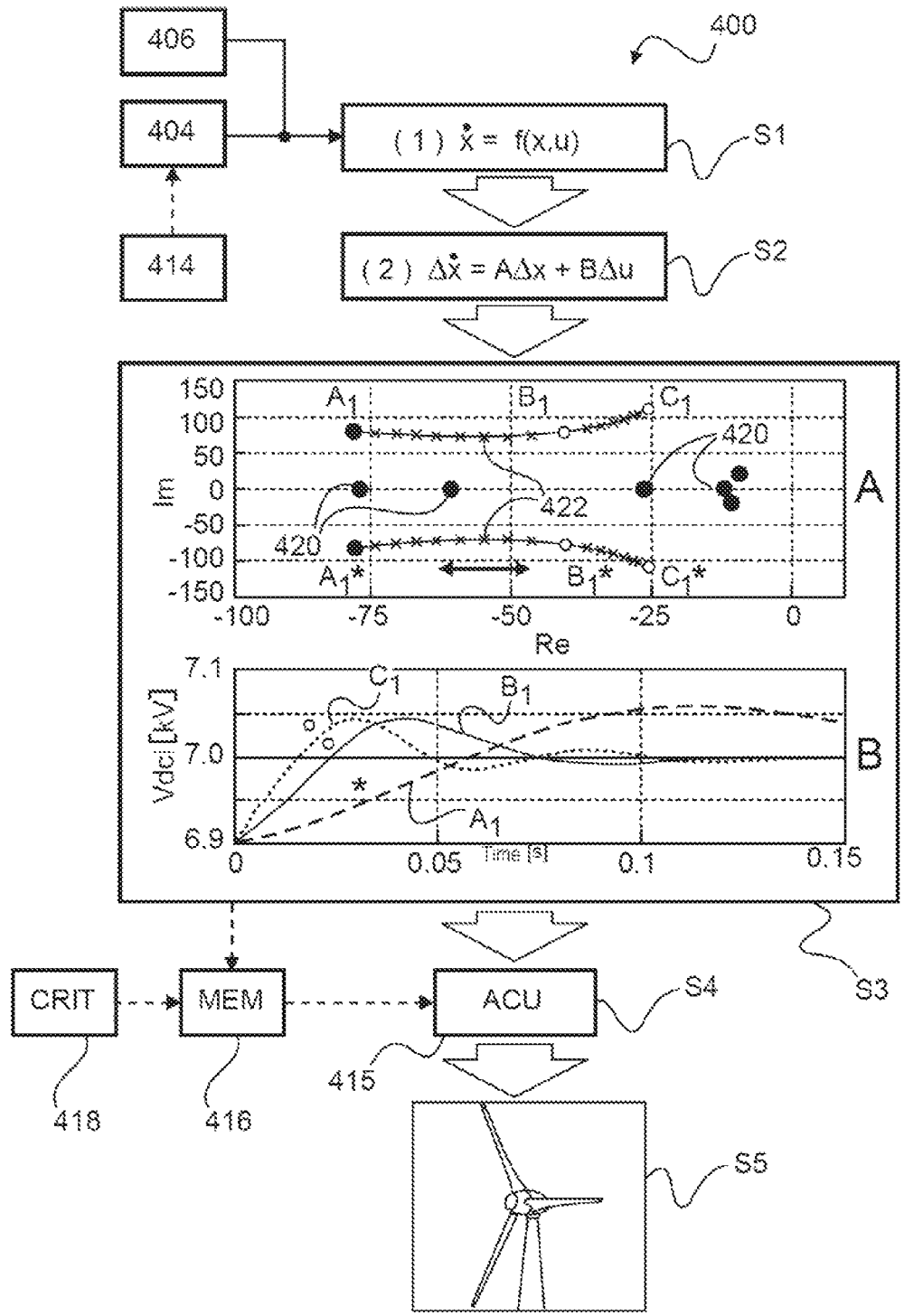
FIG. 4 schematically shows a schematic sequence of the method according to one embodiment.

FIG. 4 schematically shows a method sequence 400 of the method according to the disclosure according to an embodiment with a plurality of method steps. In this case, in a step S1, a network oscillation model is created. This comprises the network model 404 and the wind system model 406. The network oscillation model can be in a state space representation, for example, which has a plurality of differential equations as row entries. This is represented in FIG. 4 with the formula (1), which has already been described previously. In a step S2, a simplified working model is determined from the network oscillation model which has been determined in step S1. The simplified working model can be in a linear state space representation, for example. This is represented in FIG. 4 by the formula (2), which has also already been described previously.

In a step S3, a damping parameterization is determined from the simplified working model from step S2. The damping parameterization determined in this way is subsequently implemented in the controller parameterization of an adjustable controller 415 (ACU) ("adjustable control unit") in step S4. In the method step S5, the wind farm is subsequently controlled, which here forms the wind power system, with the implemented damping parameterization, in order to reduce or prevent low-frequency oscillations in the supply grid by way of a changed system behavior of the controlled wind farm. In this case, the control of the wind farm or the wind power installation is carried out by the adjustable controller 415 (ACU).

In addition, FIG. 4 has a generator model 414 which is incorporated into the network model 404 in a further embodiment. This is represented by the dotted arrow which connects the block 414 with the block 404. Synchronous generators directly coupled with the grid and the interactions thereof in the dynamic grid are therefore taken into account in this embodiment.

In addition, a further embodiment is represented in FIG. 4 in which the damping parameterizations determined successively in step S3 are stored as damping parameter sets in a storage unit 416 (MEM). A plurality of damping parameterizations are therefore determined in step S3 and are subsequently saved or stored in the storage unit 416. These stored damping parameter sets are switched between depending on predetermined criteria (CRIT) 418. If an external signal of a grid operator has been received, for example, according to which the electrical supply grid has changed, it is possible to switch to a damping parameter set which has been prepared and stored for this purpose. A damping parameter set is selected accordingly for this purpose and is input into the adjustable controller 415 (ACU) or it is parameterized with the new damping parameter set. The controller parameterization can therefore also be changed during ongoing operation depending on predetermined criteria.

In addition, two diagrams A and B are shown in step S3 in FIG. 4, which diagrams are intended to illustrate the method step of determining a damping parameterization from the simplified working model.

In this case, diagram A shows an eigenvalue distribution in the complex s-plane, which has a real axis (Re) and an imaginary axis (Im). In this case, the complex s-plane in diagram A has a left and a right half-plane, wherein the left half-plane describes the stable range in which the real part is less than zero. Conversely, the right, unstable half-plane is the range in which the real part is greater than zero. In the complex s-plane, a plurality of eigenvalues 420 and 422 are represented, the distribution of which has been recorded for different controller parameterizations.

In this case, step responses for the different controller parameterizations are represented in diagram B. They can be saved as damping parameter sets. Moreover, diagrams A and B are intended to be considered together.

In diagram B, step responses for three different controller parameterizations are represented in the curves A1, B1, C1 for this purpose, wherein these parameterizations are in each case assigned to the eigenvalues A1, A1*, B1, B1* or C1, C1* from diagram A. The curve A1 shows a slower control behavior in comparison to curve B1 and C1. The three controller behaviors which are different speeds can also be read from some eigenvalues which are represented in diagram A.

It should be recognized that a change in the controller parameterization (A1, B1, C1, diagram B) of the wind power installation has a different influence on the eigenvalues 420, 422 in diagram A. For example, in contrast to the conjugated complex eigenvalue pair 422, the eigenvalues 420 change slightly or not at all by changing the controller parameterization. By contrast, the eigenvalue pair 422 moves depending on a selected controller parameterization A1, B1, C1. This is indicated with the arrow in diagram A, which illustrates that the eigenvalue pair 422 moves to the right or to the left depending on a controller parameterization.

The eigenvalue pair 422 therefore changes depending on the controller parameterization of the wind power installation or the wind farm and can be represented as a characteristic curve.

The slow controller behavior, for example for the controller parameterization A1 from diagram B, results therefore in the eigenvalue pair 422, influenceable by the parameterization, being shifted further to the left into the left half-plane of the complex plane. Conversely, a faster control behavior, for example the controller parameterization C1 from diagram B, results in the eigenvalue pair 422 being shifted to the right in the direction of positive real values. In this case, the eigenvalues can be assigned to low-frequency oscillations or oscillation modes. The closer an eigenvalue is to the right half-plane, the faster the system property that it describes. This makes it possible to select those eigenvalues which describe a desired behavior or come close to it.

By means of the method sequence 400, FIG. 4 substantially shows a method with which a damping controller is designed in each case which is thus based on a network model in each case. In step S3, parameters are varied in order to design a damping controller as a result. In order to design a further damping controller, i.e., particularly in order to obtain a further damping parameter set, the method is to be run through with a new network model, which is in fact based on a changed grid.

For this purpose, the grid operator can provide different grid descriptions for different expected network situations accordingly, for example. For this purpose, they can already in each case provide a network model, or a network model in the desired form is created from an alternative description of the grid obtained from the grid operator. For example, it is possible that the grid operator provides system descriptions of the electrical supply grid for different network situations, but which system descriptions must be firstly adapted to the network connection point of the wind power system being considered.

A new network model makes it possible to then run through the method sequence 400 again and variations of the controller parameters can also be carried out again in step S3, in order to obtain the desired damping controller for this new network model. FIG. 4 illustrates one of the most important parts of this process.

In the first step, the analytical models of the wind turbines or wind farms are combined with network equations.

In the second step, the weakly damped modes are examined.

Depending on a respective requirement, the modes are placed, i.e., specified or selected within possible frameworks, by the suitable design of the influenceable wind turbine parameters or wind farm parameters.

After a detailed examination, which can take place on the basis of simulations or prototype tests, the resulting turbine code, i.e., a parameter set, is implemented in the wind turbine.

It has therefore been recognized that electrical power systems, as electrical supply grids can also be referred to, are oscillating systems which possess natural modes below and above the system frequency, i.e., substantially below and above 50 Hz or 60 Hz. If these modes or oscillations are excited, oscillations of this type can affect the system stability if they are not sufficiently damped.

Wind power installations, which are also referred to as wind turbines, can contribute to the stabilization of power systems. In this case, it should also be noted that the lifespan of a wind turbine is many years, approximately 25 years, and that the power system can change and develop significantly during this time.

If weakly damped network oscillation modes are ideally already identified before a wind farm connection, be it by way of direct information from the relevant grid operator or on the basis of simulation studies, said network oscillation modes can potentially already be taken into account when designing wind turbine controllers and wind farm controllers.

An aim herein is to make the installation controls and wind farm controls more flexible when implementing network-critical projects, so that weakly damped network oscillation modes are still taken into account in the controller design. Moreover, these controller parameters of the installation are adapted or designed in a project-specific manner by way of grid studies, so that critical network oscillations either cannot occur or are strongly damped.

The disclosure herein is also based on the idea of not producing an active production of damping signals by means of the turbines, but rather of proposing a suitable design of wind turbine controllers and wind farm controllers for damping low-frequency oscillations, which are also referred to as power system oscillations. One particular aim of the proposal is to make immediate identification of oscillations unnecessary.

In this case, one other idea was to use combined equations for the system consisting of a wind farm and grid. One important aspect of this proposed solution is also the "continuous" nature of the solution. It does not require an online detection method for identifying oscillations in power systems. As soon as it is necessary, and if possible, a damping for a specific frequency, or a frequency range, is artificially generated by suitable design.

Since it is then a system characteristic, it will always remain available.

The invention claimed is:

1. A method for controlling a wind power system for feeding electrical power generated from wind into an electrical supply grid and for damping low-frequency oscillations in the electrical supply grid, wherein the electrical supply grid has a line voltage with a nominal line frequency, wherein low-frequency oscillations are frequency oscillations that are less than one half of the nominal line frequency, the method comprising:
performing, by a closed control circuit, damping control for damping the low-frequency oscillations, and
controlling, by the damping control, a feed-in of the electrical power into the electrical supply grid using a wind system controller, wherein the closed control circuit includes:
at least a portion of the electrical supply grid,
at least a portion of the wind power system, and
at least a portion of the wind system controller, and
wherein the damping control is configured to mitigate weakly-damped modes in the closed control circuit,
wherein the damping control includes modeling a network characteristic including oscillation properties, wherein modeling the network characteristic includes:
modeling a network that represents at least a portion of the electrical supply grid included in the closed control circuit and accounts for a structure of the at least the portion of the electrical supply grid and consumers and producers connected to the at least the portion of the electrical supply grid; and
modeling a wind system which represents a behavior of the wind power system, wherein modeling the wind system also includes a behavior of the wind system controller, and
wherein the method further comprises:
linearizing the modeled network characteristic to obtain a linearized network characteristic, wherein the linearizing is with respect to at least one working point, and
configuring the damping control based on the linearized network characteristic.

2. The method as claimed in claim 1, comprising:
modeling, by varying operational points of the wind power system, a plurality of linearized working points, each reflecting an oscillation behavior, for configuring the damping control; and
configuring the damping control, based on the plurality of modeled linearized working points, such that, for each of the plurality of modeled linearized working points, the damping control mitigates weakly-damped modes in the closed control circuit.

3. The method as claimed in claim 1, comprising:
receiving, by the wind system controller, at least one electrical voltage of the electrical supply grid as an input; and
outputting, by the wind system controller, at least one electrical output current for feeding into the electrical supply grid.

4. The method as claimed in claim 1, comprising:
configuring the damping control as multi-variable control;
receiving at least one electrical voltage of the electrical supply grid as a first input; and
receiving, as a second input, at least one variable from a list including:
an electrical intermediate circuit voltage of a direct voltage intermediate circuit of an electrical inverter;
a reactive power output by the electrical inverter;
an electrical generator power of a generator of a wind power installation; and
a speed of the generator; and at least one blade angle of adjustable rotor blades of the wind power installation.

5. The method as claimed in claim 1, further comprising modeling at least one simplified working point, wherein the damping control includes a damping parameter determined from an eigenvalue analysis and/or a modal analysis of the at least one modeled simplified working point, wherein the at least one modeled simplified working point is linearized to obtain the at least one modeled linearized working point.

6. The method as claimed in claim 1, wherein modeling the network characteristic includes modeling a generator characteristic that emulates a behavior of synchronous generators directly coupled to the electrical supply grid.

7. The method as claimed in claim 1, comprising:
determining and storing a plurality of damping parameter sets;
determining between a plurality of control structures (state controller—first order and second order PID controller or PI controller) for the damping control;
selecting, based on a selection criterion, one of the plurality of damping parameter sets and/or the plurality of control structures for operating the wind power system; and
switching between the plurality of damping parameter sets and/or the plurality of control structures during operation of the wind power system.

8. The method as claimed in claim 7, wherein the selection criterion is one of:
an external signal of a grid operator;
a time of day;
a day of week;
a calendar day;
a state of the electrical supply grid; and
a state of the wind power system.

9. The method as claimed in claim 1, wherein:
modeling the network characteristic includes modeling the network characteristic as at least one first differential equation, and
modeling the wind system includes modeling the wind system as at least one second differential equation.

10. The method as claimed in claim 1, wherein the modeled network and/or at least one simplified modeled network, determined from the at least one modeled linearized working point, is detected or adjusted continuously during operation to respond to changes in a structure of the electrical supply grid.

11. The method as claimed in claim 1, wherein the wind power system is a wind power installation or a wind farm including a plurality of wind power installations.

12. The method as claimed in claim 1, wherein the low-frequency oscillations are sub synchronous resonances.

13. The method as claimed in claim 1, comprising:
configuring the wind system controller as a robust controller for variations of the closed control circuit.

14. The method as claimed in claim 1, comprising:
configuring the damping control as multi-variable control;
receiving at least one electrical voltage of the electrical supply grid as a first input;
outputting, by the wind system controller, at least one electrical output current for feeding into the electrical supply grid; and
outputting at least one further variable from a list including:
an electrical intermediate circuit voltage of a direct voltage intermediate circuit;
a reactive power output by an inverter;
an electrical generator power;
a speed of an electrical generator; and
at least one blade angle of adjustable rotor blades.

15. The method as claimed in claim 5, wherein damping parameters are varied to produce different working models having different eigenvalues, and wherein a respective damping parameter is selected and used for the damping control of the wind power system depending on the eigenvalues.

16. The method as claimed in claim 9, wherein:
the modeled network characteristic is represented in a nonlinear state space representation, and/or
the at least one modeled simplified working point is the modeled network characteristic linearized for a selected operational point, wherein the at least one modeled simplified working point is represented in a linear state space representation.

17. A wind power system, comprising:
a closed control circuit configured to provide damping control for damping low-frequency oscillations, wherein the wind power system is configured to:
feed electrical power generated from wind into an electrical supply grid; and
damp the low-frequency oscillations in the electrical supply grid, wherein the electrical supply grid has a line voltage with a nominal line frequency, and the low-frequency oscillations have a lower frequency than half the nominal line frequency; and
a wind system controller configured to control the feeding of the electrical power into the electrical supply grid, wherein the damping control for damping the low-frequency oscillations controls the feeding of the electrical power into the electrical supply grid using the wind system control, and wherein closed control circuit includes:
at least a portion of the electrical supply grid;
at least a portion of the wind power system; and
at least a portion of the wind system control,
wherein the damping control is configured to mitigate weakly-damped modes in the closed control circuit,
wherein the damping control includes modeling a network characteristic including oscillation properties, wherein modeling the network characteristic includes:
modeling a network that represents at least the portion of the electrical supply grid included in the closed control circuit and accounts for a structure of the at least the portion of the electrical supply grid and consumers and producers connected to the at least the portion of the electrical supply grid; and
modeling a wind system which represents a behavior of the wind power system, wherein modeling the wind system also includes a behavior of the wind system controller, and
wherein the closed control circuit is based on the modeled network characteristic and being linearized with respect to at least one working point to obtain a linearized network characteristic, and provide the damping control based on the linearized network characteristic.

18. The wind power system as claimed in claim 17, comprising:
memory configured to store a plurality of damping parameter sets and/or a plurality of control structures for the damping control, wherein the plurality of damping parameter sets and/or the plurality of control structures are available for selection and retrieval from the memory for operating the wind power system, wherein the plurality of damping parameter sets and/or the plurality of control structures are configured to be changed during operation of the wind power system.

19. The wind power system as claimed in claim 18, comprising:
a selection control configured to control selecting a damping parameter set of the plurality of damping parameter sets and/or a control structure of the plurality of control structures.

* * * * *